United States Patent
Narayanan et al.

(10) Patent No.: US 7,925,929 B2
(45) Date of Patent: Apr. 12, 2011

(54) SYSTEM AND METHOD FOR GENERATING AN ORTHOGONAL ARRAY FOR SOFTWARE TESTING

(75) Inventors: Ajikumar Thaitharanikarthu Narayanan, Bangalore (IN); Ganesh Jayarama Arunachala, Bangalore (IN); Pramod Puthiya Kovilakath Varma, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 293 days.

(21) Appl. No.: 12/242,944

(22) Filed: Oct. 1, 2008

(65) Prior Publication Data

US 2010/0083053 A1 Apr. 1, 2010

(51) Int. Cl.
G06F 11/00 (2006.01)
(52) U.S. Cl. ............................................. 714/38; 714/42
(58) Field of Classification Search ....................... 714/38
See application file for complete search history.

(56) References Cited

U.S. PATENT DOCUMENTS

| | | | |
|---|---|---|---|
| 2003/0126505 A1* | 7/2003 | Lacey, III | 714/38 |
| 2005/0066233 A1* | 3/2005 | Day et al. | 714/38 |
| 2006/0010426 A1* | 1/2006 | Lewis et al. | 717/124 |
| 2008/0082968 A1* | 4/2008 | Chang et al. | 717/128 |
| 2008/0127033 A1* | 5/2008 | Godwin et al. | 717/100 |
| 2008/0178045 A1* | 7/2008 | Son | 714/38 |
| 2009/0077538 A1* | 3/2009 | Keyes | 717/124 |

* cited by examiner

*Primary Examiner* — Scott T Baderman
*Assistant Examiner* — Kamini Patel
(74) *Attorney, Agent, or Firm* — Prakash Nama; Global IP Services, PLLC (57) ABSTRACT

A system and method for generating an orthogonal array (OA) for software testing is disclosed. In one embodiment, the method for generating an OA of test cases for testing a system includes accepting a user input from a user, the user input including multiple factors and multiple levels associated with the system, accessing a reference table to determine a set of parameters based on the user input for testing each level of a factor against all levels of all other factors in the system, and performing a predetermined number of iterations based on the set of parameters to generate the OA of the test cases. The OA of the test cases includes combinations of the multiple factors and the multiple levels required for testing pair-wise interactions between the multiple levels and the multiple factors in the system.

21 Claims, 9 Drawing Sheets

| SL. NO. | FACTOR NAME | NO. OF LEVEL | LEVELS → | | | |
|---|---|---|---|---|---|---|
| 1 | F1 | 4 | F1A | F1B | F1C | F1D |
| 2 | F2 | 3 | F2A | F2B | F2C | |
| 3 | F3 | 3 | F3A | F3B | F3C | |
| 4 | F4 | 1 | F4A | | | |

| RUNS | F1 | F2 | F3 | F4 |
|---|---|---|---|---|
| 1 | F1A | F2A | F3A | F4A |
| 2 | F1B | F2A | F3B | F4A |
| 3 | F1C | F2A | F3C | F4A |
| 4 | F1D | F2A | F3A | F4A |
| 5 | F1A | F2B | F3B | F4A |
| 6 | F1B | F2B | F3C | F4A |
| 7 | F1C | F2B | F3A | F4A |
| 8 | F1D | F2B | F3B | F4A |
| 9 | F1A | F2C | F3C | F4A |
| 10 | F1B | F2C | F3A | F4A |
| 11 | F1C | F2C | F3B | F4A |
| 12 | F1D | F2C | F3C | F4A |

| SL. NO. | FACTOR NAME | NO. OF LEVEL | LEVELS... | | | | | |
|---|---|---|---|---|---|---|---|---|
| 1 | F1 | 6 | 0 | 1 | 2 | 3 | 4 | 5 |
| 2 | F2 | 6 | 0 | 1 | 2 | 3 | 4 | 5 |
| 3 | F3 | 4 | 0 | 1 | 2 | 3 | | |
| 4 | F4 | 4 | 0 | 1 | 2 | 3 | | |
| 5 | F5 | 3 | 0 | 1 | 2 | | | |
| 6 | F6 | 3 | 0 | 1 | 2 | | | |
| 7 | F7 | 2 | 0 | 1 | | | | |
| 8 | F8 | 2 | 0 | 1 | | | | |

| RUNS | F1 | F2 | F3 | F4 | F5 | F6 | F7 | F8 |
|---|---|---|---|---|---|---|---|---|
| 1 | 0 | 0 | 0 | 0 | 0 | 0 | 0 | 0 |
| 2 | 1 | 0 | 1 | 2 | 0 | 1 | 1 | 0 |
| 3 | 2 | 0 | 2 | 0 | 0 | 1 | 1 | 1 |
| 4 | 3 | 0 | 3 | 2 | 2 | 2 | 1 | 0 |
| 5 | 4 | 0 | 0 | 1 | 2 | 2 | 0 | 1 |
| 6 | 5 | 0 | 1 | 3 | 1 | 0 | 0 | 0 |
| 7 | 0 | 0 | 2 | 1 | 1 | 0 | 0 | 1 |
| 8 | 0 | 1 | 1 | 1 | 1 | 1 | 1 | 1 |
| 9 | 1 | 1 | 2 | 3 | 1 | 2 | 0 | 0 |
| 10 | 2 | 1 | 3 | 1 | 0 | 2 | 0 | 0 |
| 11 | 3 | 1 | 0 | 0 | 0 | 0 | 0 | 1 |
| 12 | 4 | 1 | 1 | 2 | 0 | 0 | 0 | 0 |
| 13 | 5 | 1 | 2 | 0 | 2 | 0 | 1 | 1 |
| 14 | 0 | 1 | 0 | 2 | 2 | 1 | 1 | 0 |
| 15 | 0 | 2 | 2 | 2 | 2 | 2 | 0 | 0 |
| 16 | 1 | 2 | 3 | 0 | 2 | 0 | 0 | 1 |
| 17 | 2 | 2 | 0 | 2 | 1 | 0 | 1 | 0 |
| 18 | 3 | 2 | 1 | 1 | 1 | 0 | 1 | 0 |
| 19 | 4 | 2 | 2 | 3 | 0 | 1 | 1 | 1 |
| 20 | 5 | 2 | 0 | 1 | 0 | 1 | 0 | 0 |
| 21 | 0 | 2 | 1 | 0 | 0 | 2 | 0 | 1 |
| 22 | 0 | 3 | 3 | 3 | 0 | 0 | 1 | 1 |
| 23 | 1 | 3 | 0 | 1 | 0 | 0 | 1 | 0 |
| 24 | 2 | 3 | 1 | 0 | 2 | 1 | 0 | 1 |
| 25 | 3 | 3 | 2 | 2 | 2 | 1 | 0 | 0 |
| 26 | 4 | 3 | 0 | 0 | 1 | 2 | 0 | 0 |
| 27 | 5 | 3 | 1 | 2 | 1 | 2 | 0 | 1 |
| 28 | 0 | 3 | 2 | 1 | 0 | 0 | 1 | 0 |
| 29 | 0 | 4 | 0 | 0 | 1 | 1 | 0 | 0 |
| 30 | 1 | 4 | 1 | 2 | 0 | 1 | 0 | 1 |
| 31 | 2 | 4 | 2 | 1 | 0 | 2 | 0 | 0 |
| 32 | 3 | 4 | 0 | 3 | 0 | 2 | 1 | 1 |
| 33 | 4 | 4 | 1 | 1 | 2 | 0 | 1 | 0 |
| 34 | 5 | 4 | 2 | 0 | 2 | 0 | 1 | 0 |
| 35 | 0 | 4 | 3 | 2 | 1 | 0 | 0 | 1 |
| 36 | 0 | 5 | 1 | 1 | 2 | 2 | 1 | 1 |
| 37 | 1 | 5 | 2 | 0 | 1 | 2 | 1 | 0 |
| 38 | 2 | 5 | 0 | 2 | 1 | 0 | 1 | 1 |
| 39 | 3 | 5 | 1 | 0 | 0 | 0 | 0 | 0 |
| 40 | 4 | 5 | 2 | 2 | 0 | 0 | 0 | 1 |
| 41 | 5 | 5 | 3 | 1 | 0 | 1 | 0 | 0 |
| 42 | 0 | 5 | 0 | 3 | 0 | 1 | 0 | 0 |
| 43 | 0 | 0 | 2 | 2 | 0 | 0 | 0 | 0 |
| 44 | 1 | 0 | 0 | 1 | 2 | 0 | 0 | 1 |
| 45 | 2 | 0 | 1 | 3 | 2 | 0 | 0 | 0 |
| 46 | 3 | 0 | 2 | 1 | 1 | 1 | 0 | 1 |
| 47 | 4 | 0 | 3 | 0 | 1 | 1 | 1 | 0 |
| 48 | 5 | 0 | 0 | 2 | 0 | 2 | 1 | 1 |
| 49 | 0 | 0 | 1 | 0 | 0 | 2 | 1 | 0 |

SYSTEM AND METHOD FOR GENERATING AN ORTHOGONAL ARRAY FOR SOFTWARE TESTING

FIELD OF TECHNOLOGY

Embodiments of the present invention relate to the field of testing of computer software. More particularly, embodiments of the present invention relate to a system and method for generating an orthogonal array (OA) for software testing.

BACKGROUND

Software testing aids in maintaining quality of a software product by revealing defects of the software product. Software testing typically entails identifying specific test cases to verify that the software product correctly performs expected functionalities of the software product. Further, the software product may be a complex system, i.e., a system including several components/modules, which may require generation of a large number of test cases which can be particularly a challenging task. It is through testing of individual components/modules, a tester verifies that each component/module performs its designated functionality without any error. Additionally, the tester is typically required to test interactions between different states (e.g., active, inactive, etc.) of the different components/modules to ensure that the components/modules collectively perform the system's designated functionalities flawlessly, in each state and at all times. A first challenge in testing complex systems may be, in identifying an optimum number of test cases to be generated for providing a maximum possible coverage. Identifying such optimum number of test cases, required for providing the maximum possible coverage, can be an arduous task. Even after performing the arduous task of identifying the optimum number of test cases for the complex system, the tester may remain unsure whether enough test cases are considered for providing the maximum possible coverage.

A second challenge in conducting the complex system testing may be ascertaining contents of each test case. Typically, test cases are selected intuitively. A test case selection may be based on tester's expertise and experience on similar projects. Alternatively, the test case selection may be based upon criticality of the complex system. Further, the test cases may be generated either manually or automatically. However, the manual test case generation may increase testing cycle time and may be more error prone. A third challenge in generating test cases for the complex system can be providing a distributed coverage of a software testing domain. Further, arriving at complex combinations of all variables of a complex multi-variable system can be extremely taxing. Problem may exacerbate when the tester seeks to manually identify a concise set of test cases in the complex multi-variable system. After identifying the concise set of test cases in the complex multi-variable system, executing the testing based on the concise set of test cases can be demanding. Also, keeping track of a large number of the generated test cases and maintaining results of the test cases in a cohesive manner can be equally or more demanding.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follow.

DETAILED DESCRIPTION

A system and method for generating an orthogonal array (OA) for software testing is disclosed. In the following description, for purposes of explanation, numerous specific details are set forth in order to provide a thorough understanding of the various embodiments. It will be evident, however, to one skilled in the art that the various embodiments may be practiced without these specific details.

In the document, the term "factor" refers to a component in a system to be tested and the term "level" refers to a state associated with the component of the system. Further, the term "system" refers to a software application including a plurality of components to be tested.

Figure 1:
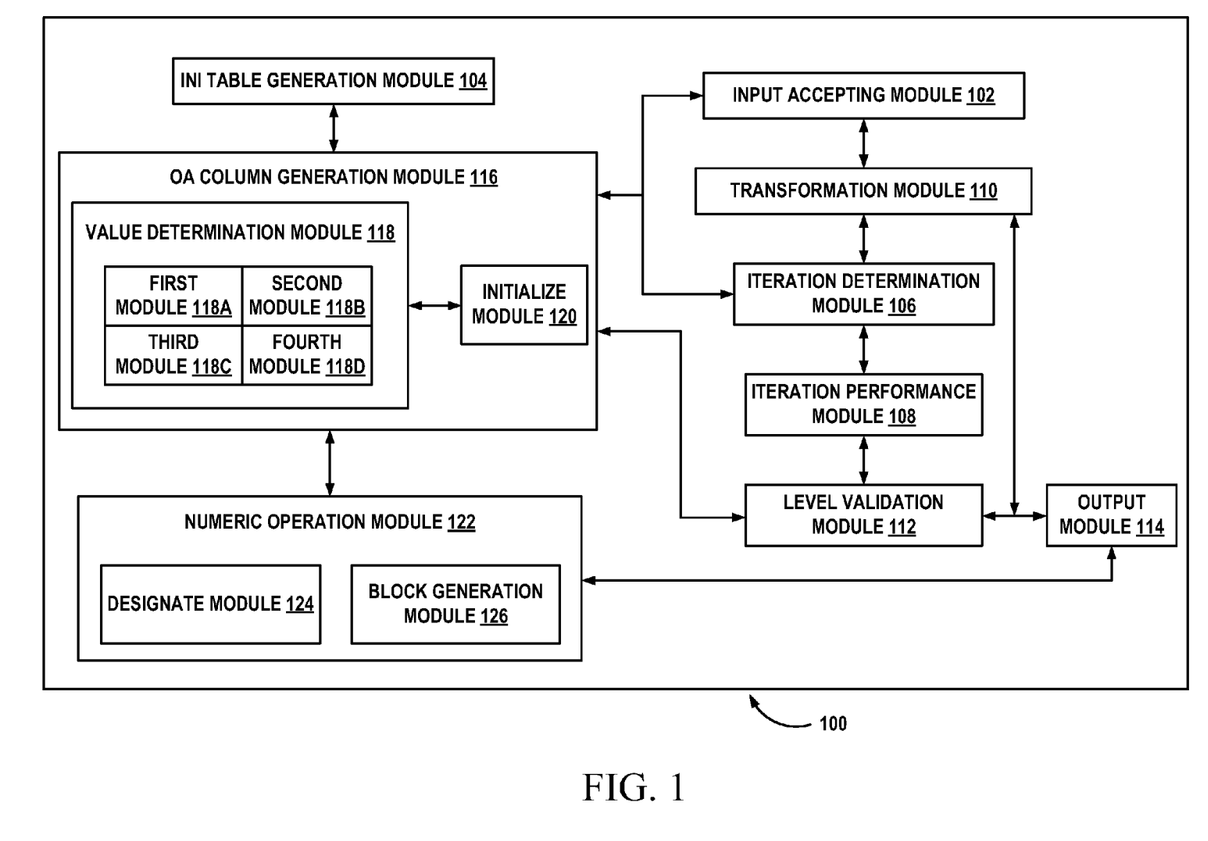
FIG. 1 shows a block diagram illustrating a high level architecture of an orthogonal array (OA) tool, according to one embodiment.

FIG. 1 shows a block diagram 100 illustrating a high level architecture of an OA tool, according to one embodiment. Particularly, FIG. 1 illustrates an input accepting module 102, an iteration and interaction (INI) table generation module 104, an iteration determination module 106, an iteration performance module 108, a transformation module 110, a level validation module 112, an output module 114, an OA column generation module 116 including a value determination module 118 and an initialize module 120, and a numeric operation module 122 which includes a designate module 124 and a block generation module 126. Also, as shown in FIG. 1, the value determination module 118 includes a first module 118A, a second module 118B, a third module 118C and a fourth module 118D.

In operation, the input accepting module 102 accepts a user input for generating an OA of test cases. For example, the user input includes multiple factors and multiple levels associated with a system in a first format. In one embodiment, the INI table generation module 104 generates an INI table (e.g., the INI table 600 of FIG. 6). In an alternate embodiment, the INI table generation module 104 merely accesses an INI table generated by a different source. For example, the INI table includes multiple pairs of a number indicating a level in the system and an associated number indicating a prime of the number indicating the level in the system. In these embodiments, the iteration determination module 106 accesses the INI table to determine a number of iterations required, based on a set of parameters (e.g., based on the user input) for testing each level of a factor against all levels of all other factors in the system.

Further, the iteration performance module 108 performs the number of iterations (as determined by the iteration determination module 106) to generate the OA of the test cases. For example, the OA of the test cases includes combinations of the multiple factors and the multiple levels required for testing pair-wise interactions between the multiple levels and the multiple factors. In one embodiment, the transformation module 110 transforms the user input from the first format into a second format for processing the user input, and subsequently sorts the multiple levels from the transformed user input in a descending order. In another embodiment, the transformation module 110 is configured to transform results of the predetermined number of iterations from the second format to the first format and re-orders the transformed results of the predetermined number of iterations according to predetermined criteria. Further, the level validation module 112 replaces additional levels by valid levels when a number of the levels are greater than number of actual levels in the system. Finally, the output module 114 outputs the reordered results of the predetermined number of iterations in the first format.

In accordance with one or more embodiments described above, the block generation module 126 first creates a block by listing levels $0, 1, \ldots, k-1$, where k is a highest level as obtained from the user input. Then, the OA column generation module 116 generates a first column of the OA by repeating the created block parameter p times. Further, the initialize module 120, via parameters q, g, h and x, performs a set of initialization functions. For example, the initialization module 120 initializes the parameters $q_0$ to 1 and $g_0$ to 2, and the parameter h to 0. The numeric operation module 122 then determines if the parameter x is less than a parameter n (i.e., the number of multiple factors in the system). As illustrated in FIG. 1, the numeric operation module 122 is coupled to the output module 114. In one embodiment, if the parameter x is equal to the parameter n, then the output module 114 outputs a result of each iteration in the first format.

In another embodiment, the numeric operation module 122 is configured to perform a set of operations if the parameter x is less than the parameter n and to increment the parameter h by 1. In this embodiment, the numeric operation module 122 includes the designate module 124 and the block generation module 126 to perform the set of operations. For example, the designate module 124 designates the parameters e to h−1, p to $p_h$, g to $g_e$, and q to $q_e$, and the block generation module 126 is configured to generate a block including the multiple levels in the system in an ascending order.

Further, the OA column generation module 116 is configured to generate a $Cg^{th}$ column by iteratively assigning values for each block until a parameter (p−1) is assigned for a $p^{th}$ block, and to iteratively generate a $Cx^{th}$ column of the OA until the parameter x is equal to the parameter n. In some embodiments, the OA column generation module 116, which is configured to iteratively generate the $Cx^{th}$ column of the OA, includes the initialize module 120 for setting values of parameters i and j to 1. In these embodiments, the OA column generation module 116 also includes the value determination module 118 which is configured to determine a value of an element in the $Cx^{th}$ column of the OA while the parameter i is less than the parameter p.

As illustrated in FIG. 1, the value determination module 118 includes a first module 118A which is configured to determine if the parameter j is less than or equal to the parameter q. If so, the first module 118A calculates a value of the parameter x by multiplying a parameter Ci and a parameter Cj (i.e., x=Ci*Cj). Further, a second module 118B of the value determination module 118 is configured to calculate a parameter result 1 by adding the parameter x to a parameter Cg (i.e., result 1=x+Cg). In addition, a third module 118C configured to set a value of all the elements in the $Cx^{th}$ column of the OA to a parameter result 1 mod parameter p (i.e., OA [i, $Cx^{th}$] =result 1 mod p). After generating the elements in each row of the $Cx^{th}$ column of the OA, the third module 118C increments the parameter j by 1. Furthermore, the value determination module 118 includes a fourth module 118D which is configured to increment the parameter i by 1 if the parameter i is less than the parameter p.

Figure 2:
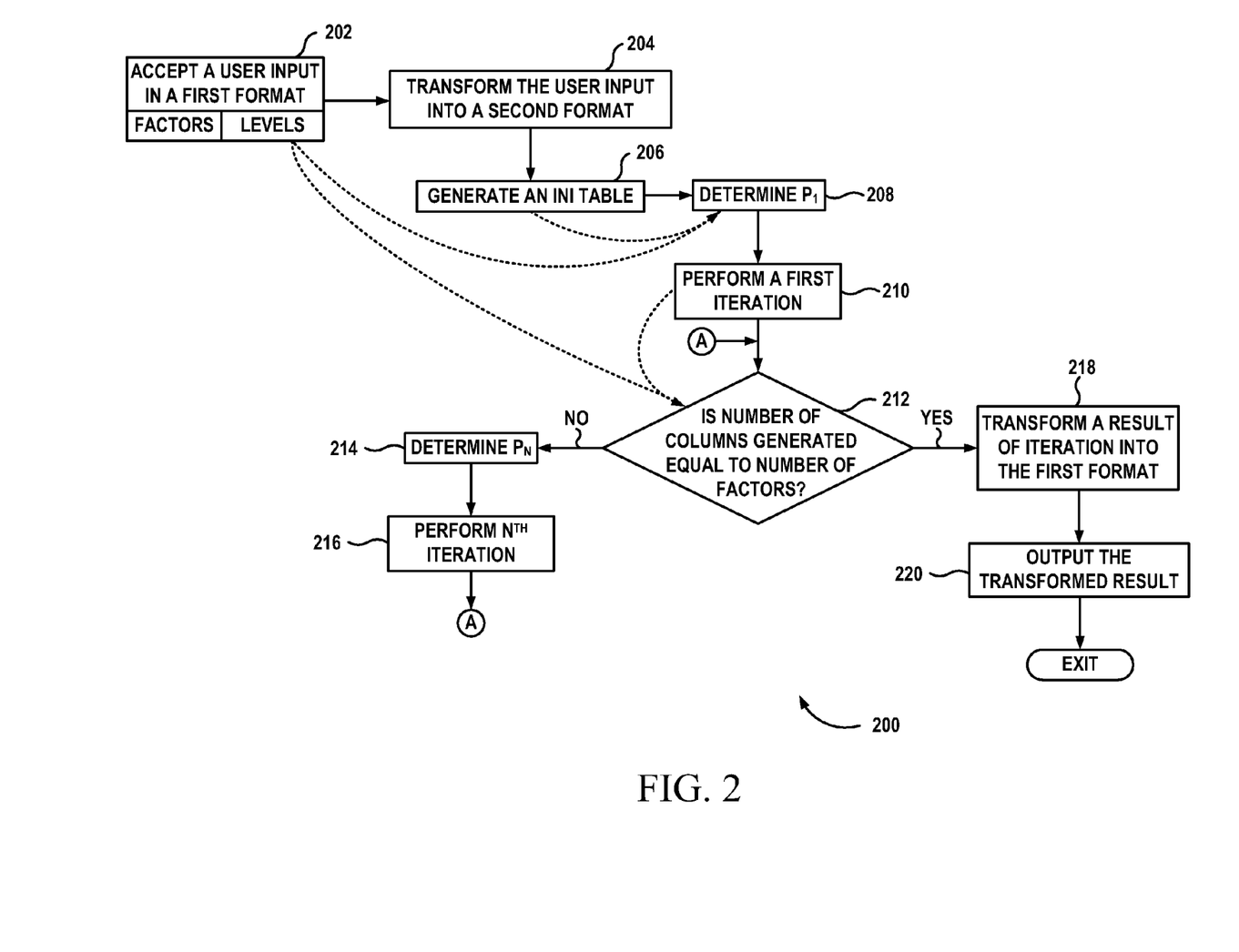
FIG. 2 shows a process flow of processing a user input using an Iteration and Interaction table (INI table) prior to generating an OA, according to one embodiment.
Figure 6:
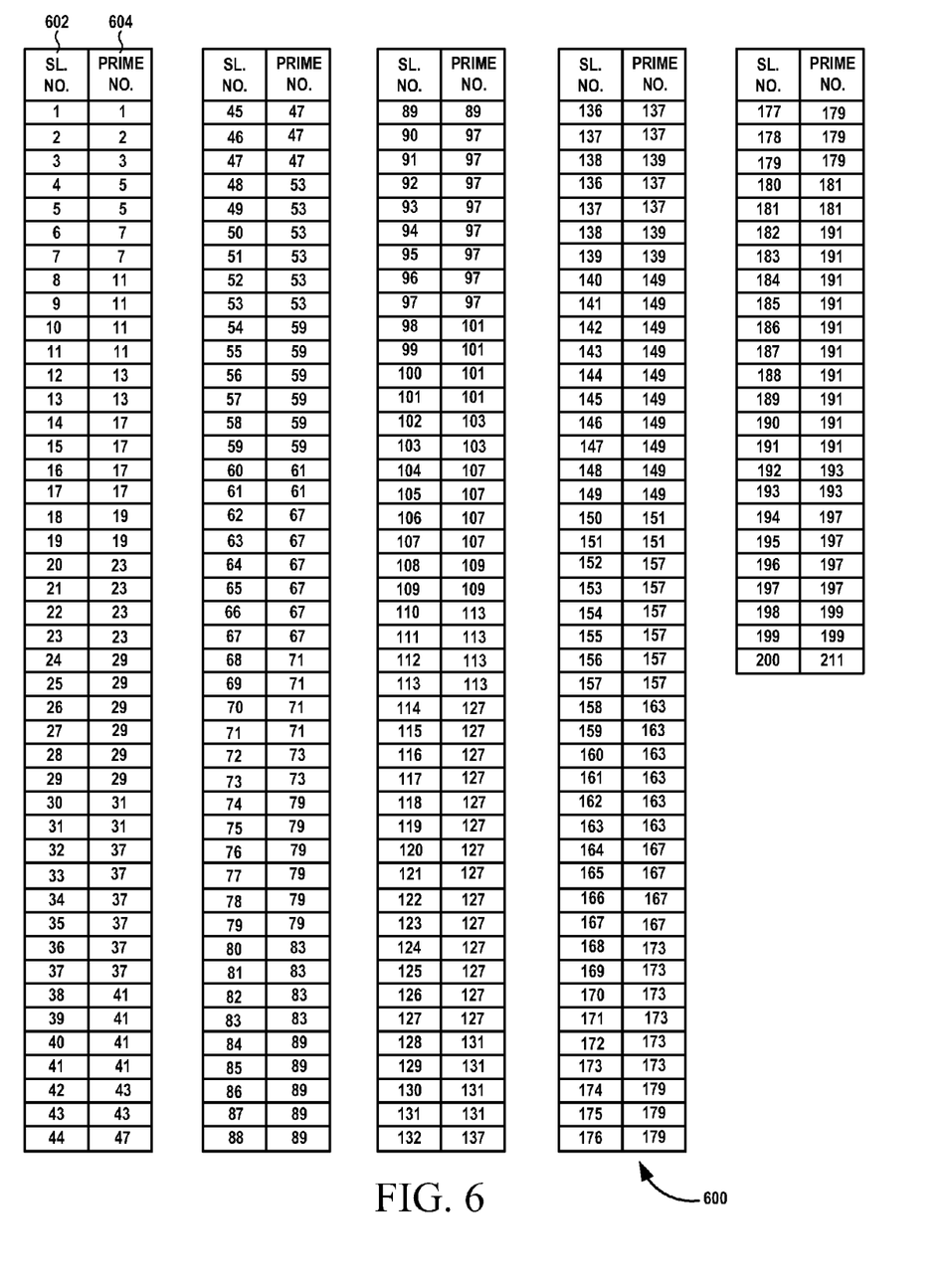
FIG. 6 shows an exemplary INI table, according to one embodiment.

FIG. 2 shows a process flow 200 of processing a user input using the INI table prior to generating an OA, according to one embodiment. In step 202, the user input is accepted in a first format (e.g., alpha-numeric expression). For example, the user input includes multiple factors and multiple levels associated with a system. In step 204, the user input in the first format is transformed into a second format for processing. In some embodiments, the user input is processed by transforming the user input from the first format to the second format and by sorting the multiple levels in the transformed user input in a descending order. In step 206, the INI table is generated. The INI table is a reference table that is generated and accessed to determine a set of parameters for testing each level of the factor against all the levels of all other factors in the system. An exemplary INI table is illustrated in FIG. 6. In step 208, p1 is determined. It can be seen from FIG. 2 that, inputs from steps 202 and 206 are used to determine p1. For example, the value of p1 indicates a level associated with a factor in the system, wherein, mod p1 is a prime number.

In step 210, a first iteration is performed based on the processed user input. In some embodiments, a predetermined number of iterations are performed based on the set of parameters to generate the OA of test cases that includes combinations of the multiple factors and the multiple levels required for testing pair-wise interactions between the multiple levels and the multiple factors. In step 212, it is determined whether a number of columns generated is equal to the number of multiple factors (n) in the system. As shown in FIG. 2, the determination in step 212 is made using inputs from step 204 and step 210. If it is determined that the number of columns generated is not equal to the number of multiple factors (n) in the system, then the process 200 determines pN in step 214. Further, $N^{th}$ iteration is performed in step 216, and determination is made in step 212 as to whether the number of columns generated is equal to the number of multiple factors (n) in the system.

If it is determined in step 212 that the number of columns generated is equal to the number of multiple factors (n) in the system, a result of the first iteration is transformed from the second format into the first format in step 218. In some embodiments, the transformed result of the first iteration is reordered according to predetermined criteria (e.g., in an ascending order, descending order, etc.). Further, the reordered result is outputted in the first format in step 220 and the process 200 is ended.

Figure 3A:
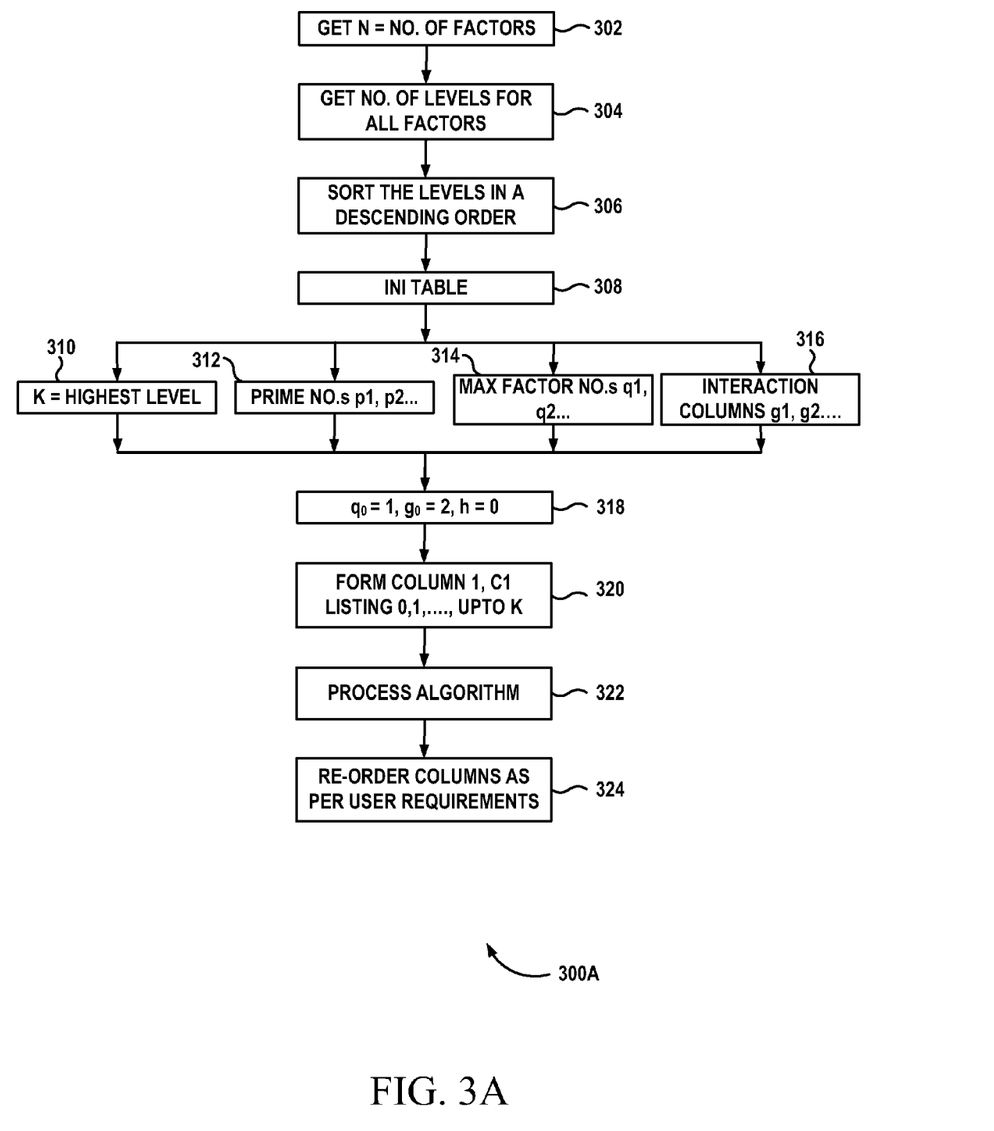
FIG. 3 shows a flow diagram of a process of generating an OA of test cases for testing a system, according to one embodiment.
Figure 3B:
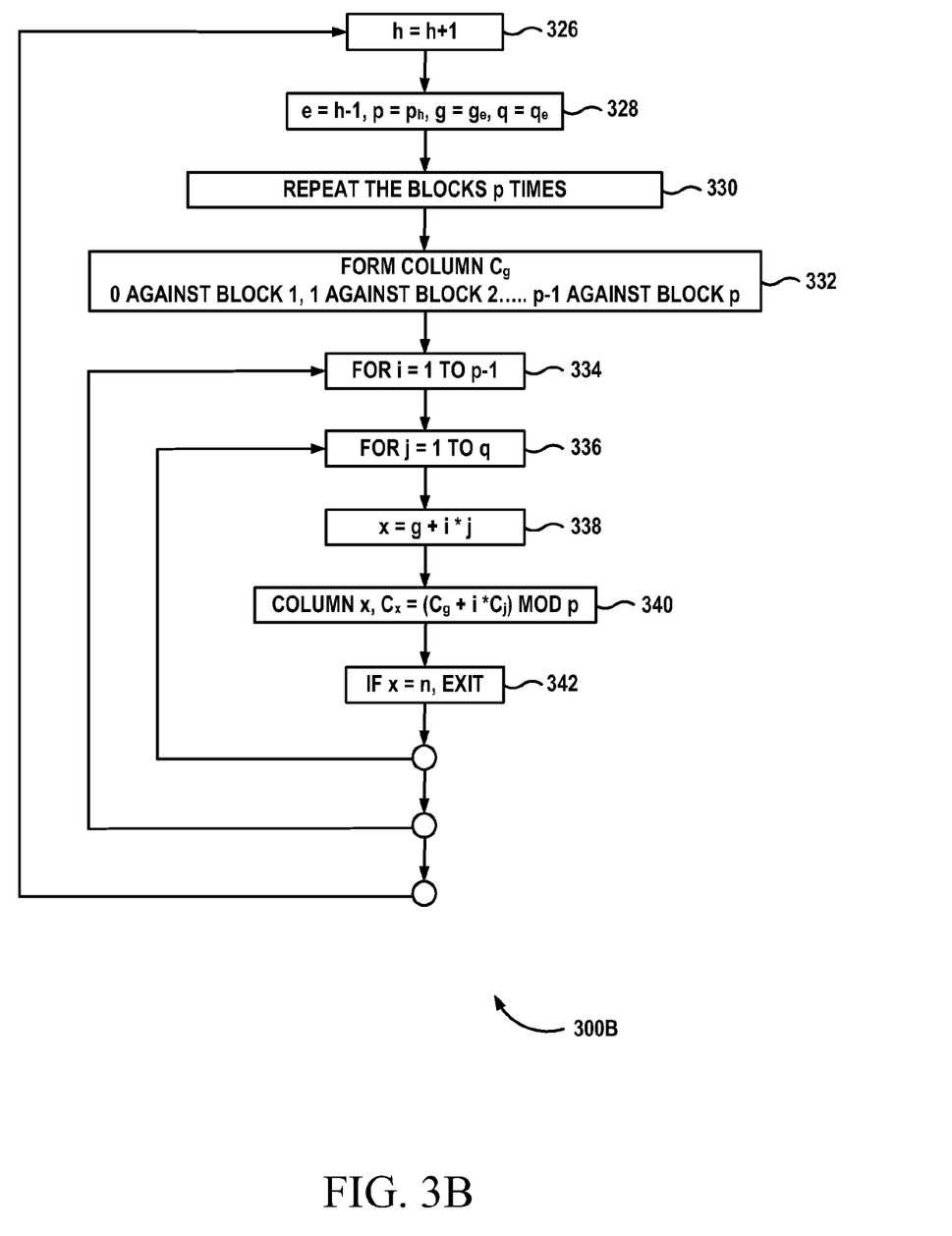

FIG. 3 shows a flow diagram of a process of generating an OA of test cases for testing a system, according to one embodiment. Particularly, FIG. 3A illustrates an OA algorithm 300A and FIG. 3B illustrates a process algorithm 300B. As illustrated in block 302, multiple factors (e.g., components) associated with the system are obtained. Further, multiple levels (e.g., states) associated with each factor are obtained, as indicated by block 304. In some embodiments, the multiple factors and the multiple levels associated with each factor of the system are obtained from a user (e.g., practitioner, customer, etc.) in a first format. The factors and the levels associated therein form an input for the OA algorithm 300A to generate the OA of the test cases which includes combinations of the multiple factors and the multiple levels for testing pair-wise interactions between the multiple levels and the multiple factors.

In addition, the levels associated with the multiple factors are sorted in a descending order as indicated by block 306. In one exemplary implementation, the INI table (e.g., a reference table) indicated by block 308, is accessed to determine a set of parameters based on the user input for generating the OA of test cases for the system. For example, the set of parameters that is determined using the INI table including but not limited to a highest level (k) as indicated by block 310, prime numbers (p1, p2, p3, etc.) as indicated by block 312, maximum factor numbers (q1, q2, q3, etc.) as indicated by block 314, and interaction columns (g1, g2, g3, etc.) as indicated by block 316.

The next step in the OA algorithm 300A includes initializing the aforementioned set of parameters. For example, block 318 illustrates a value of the parameters q0, g0 and h which are set to 1, 2 and 0, respectively. Further, block 320 illustrates generation of a first column (C1) of the OA. In one exemplary implementation, the first column C1 of the OA is generated in two steps. At first, a block of all levels within k (where k is a highest level obtained from the INI table) is created and then as a second step, the created block is repeated vertically parameter p times. This process is explained in greater detail with respect to FIG. 3B.

Further, block 322 illustrates that the process algorithm is applied to generate remaining columns of the OA, such that the number of columns in the OA is equal to the number of multiple factors (n) associated with the system. The process algorithm illustrated in block 322 is explained in greater detail in FIG. 3B. Finally, the columns are re-ordered as per user requirements, as illustrated in block 324.

Referring to FIG. 3B, block 326 illustrates incrementing a parameter h by 1 (i.e., h=h+1). In some embodiments, it is determined whether a parameter x is less than the parameter n (i.e., the number of multiple factors (n) in the system). In these embodiments, if the determination is true, then a set of operations is performed and the parameter h is incremented by 1. If the determination is false, a result of each iteration is outputted in the first format. Further, blocks 328 to 340 illustrate the sequence of operations performed.

Block 328 illustrates designating the parameters e to h−1, p to $p_h$, g to $g_e$ and q to $q_e$. In some embodiments, a block which includes the multiple levels in the system in an ascending order is created. In these embodiments, the created block is repeated vertically parameter p times, as indicated by block 330. Further, block 332 illustrates generation of a $Cg^{th}$ column of the OA by iteratively assigning values for each block until a parameter (p−1) is assigned for a $p^{th}$ block, i.e., 0 is placed against a first block in the $Cg^{th}$ column of the OA, 1 is placed against a second block in the $Cg^{th}$ column of the OA, till the parameter p−1 is placed against the $p^{th}$ block in the $Cg^{th}$ column of the OA.

In addition, a column C3 of the OA is formed using C2+1*C1. Similarly, a column C4 of the OA is formed using C2+2*C1. This process is repeated until a column Cq1 of the OA is formed. The above created block is repeated vertically parameter p2 times. Then, a column Cg1 of the OA is formed by putting 0 against a first block, 1 against a second block and so on till a parameter '(p2−1)' is put against a $p2^{nd}$ block. Further, form Cg1+1:Cg1+1*C1, i.e., [Cg1+1*C1] mod p2 and form Cg1+2:Cg1 (+) 1*C2, till a column g1+q1, Cg1+q1:Cg1+1*Cq1 is reached. Then, form Cg1+q1+1:Cg1 (+)2*C1, i.e., [Cg1+2*C1] mod p2 and form Cg1+q1+2:Cg1 (+)2*C2 till we reach a column g1+2*q1, Cg1+2*q1: Cg1+2*Cq1. The process continues till a column Cq2 of the OA is reached. The above created block is repeated vertically parameter p3 times.

Now, a column Cg2 of the OA is formed by putting 0 against a first block, 1 against a second block and so on till a parameter 'p3−1' is put against a $p3^{rd}$ block. Form Cg2+1: Cg2+1*C1, i.e., [Cg2+1*C1] mod p3, form Cg2+2:Cg2+1*C2 till we reach a column g2+q2, Cg2+q2: Cg2+1*Cq2. Also, form Cg2+q2+1:Cg2+2*C1, i.e., [Cg2+2*C1] mod p3 and form Cg2+q2+2:Cg2+2*C2 till column g2+2*q2, Cg2+2*q2:Cg2+2*Cq2 is reached. The process is continued till a column Cq3 of the OA is reached. The above created block is repeated vertically parameter p4 times and so on.

Further, a $Cx^{th}$ column of the OA is formed (i.e., generated iteratively) by using $Cx=(Cg+i*Cj)$ mod p, as illustrated in block 340. In some embodiments, iteratively generating the $Cx^{th}$ column of the OA includes setting parameters i and j to 1 as indicated by blocks 334 and 336 and determining a value of an element in the $Cx^{th}$ column of the OA while the parameter i is less than the parameter p.

In one embodiment, if the parameter j is less than or equal to the parameter q, then a value of the parameter x is set by adding a product of the parameter i and the parameter j to the parameter g (as indicated by block 338), a parameter result 1 is calculated by adding a value of the parameter i times a parameter Cj to a parameter Cg, a value of all the elements in the $Cx^{th}$ column of the OA is set to the parameter result 1 mod parameter p (as indicated in block 340), and the parameter j is incremented by 1. In another embodiment, the parameter i is incremented by 1 if the parameter j is not less than or equal to the parameter q. When the parameter x is equal to the parameter n (i.e., the number of multiple factors (n) in the system), the process algorithm 300B is terminated, as indicated by block 342. It is appreciated that the $Cx^{th}$ column of the OA is iteratively generated until the parameter x is equal to the parameter n.

It can be noted that, once the required number of columns are created, each column is referred. Thus, when 'number of levels' is greater than 'number of actual levels', additional levels are replaced by valid levels. Further, a full block is checked for duplicate rows and deleted if any duplicate test cases are found. Dummy levels are replaced with actual level names and dummy factors are replaced with actual factor names. Finally, the columns are re-ordered (as indicated by block 324 of FIG. 3A) as per factor entry order by the user (i.e., as per the user requirement).

Figure 4A:
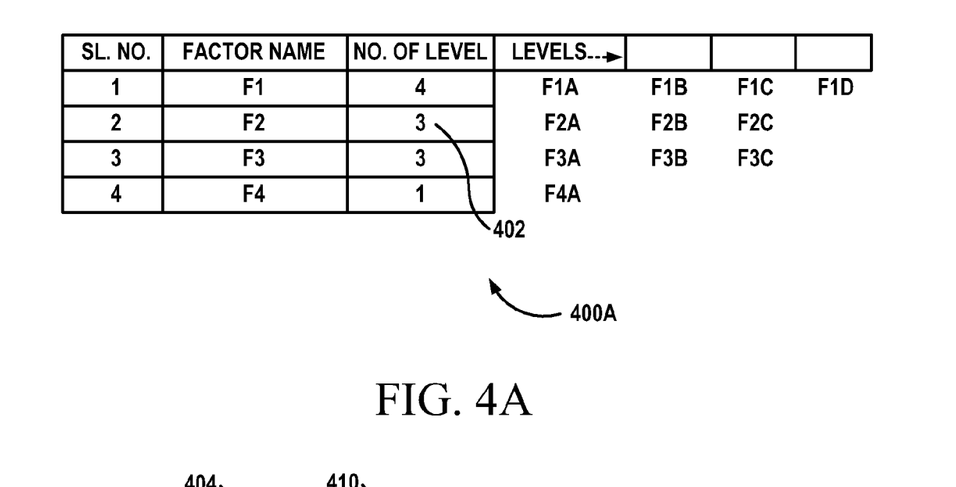
FIGS. 4A and 4B show example snapshots of a first sample user input in a first format and of an OA resulting from the first sample user input in the first format.
Figure 4B:
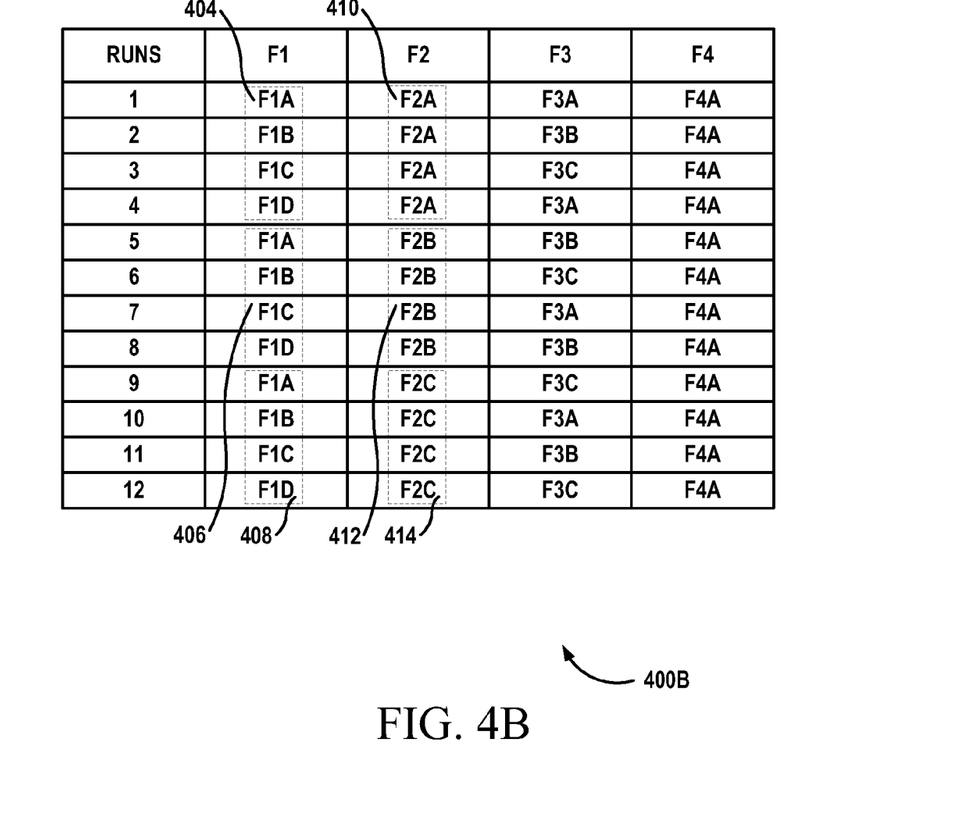

FIGS. 4A and 4B show example snapshots of a first sample user input in a first format and of an OA resulting from the first sample user input in the first format. It is appreciated that the OA shown in a table 400B is generated using the OA algorithm 300A described in FIGS. 3A and 3B. Particularly, FIG. 4A illustrates a table 400A showing the first sample user input provided by a user (e.g., a customer), i.e., including multiple factors and multiple levels of each factor associated with a system. Resulting from the first sample user input, is the OA as shown in the table 400B of FIG. 4B. The generated OA shown in the table 400B includes combinations of the multiple factors and the multiple levels required for testing pair-wise interactions between the multiple levels and the multiple factors.

In one embodiment, the OA for a given number of multiple factors (n) and levels is generated by performing a predetermined number of iterations that are based on a set of parameters. For example, the set of parameters include but not limited to pi's, gi's, qi's and k, which are obtained by accessing the reference table (also referred as INI table). For example, pi's are prime numbers indicating a level in the system, gi's are interaction columns, qi's are maximum factor numbers and k is a highest level. It can be noted that, the INI table also includes an associated number indicating a prime of the number indicating the level in the system.

In the example embodiment illustrated in FIG. 4A, the table 400A shows the first sample user input including the factors and the levels in the first format. As illustrated in FIG. 4A, a number of multiple factors (n) obtained from the user is four, i.e., F1, F2, F3 and F4 and a number of levels obtained from the user corresponding to each factor is 4, 3, 3 and 1, respectively, that are sorted in a descending order. Therefore, as shown in FIG. 4A, the levels associated with the factor F1 are indicated as F1A, F2B, F3C and F4D, the levels associated with the factor F2 are indicated as F2A, F2B and F2C, the levels associated with the factor F3 are indicated as F3A, F3B and F3C and the level associated with the factor F4 is indicated as F4A.

It is appreciated that the first sample user input is transformed from the first format to a second format, for the purpose of processing the first sample user input. In this example embodiment, the levels F1A, F2A, F3A and F4A are transformed to a value 0. The levels F1B, F2B, and F3B are transformed to a value 1. The levels F1C, F2C, and F3C are transformed to a value 2 and the level F1D is transformed to a value 3. For example, the levels F1A, F1B, F1C, F1D, F2A, F2B, F2C, F3A, F3B and F4A are in the first format. Further, the levels 0, 1, 2 and 3 are in the second format. Based on the number of levels and the number of factors obtained from the user, a set of parameters such as g, p, q, k, etc. are obtained by accessing the INI table as discussed above. Now, generation of the OA (e.g., illustrated in the table 400B) based on the first sample user input is as follows.

It can be seen from the table 400B that, all the levels are shown in the first format. In one embodiment, results of the predetermined number of iterations are transformed from the second format to the first format upon performing the predetermined number of iterations. In one embodiment, a number of columns in the OA is equal to the number of multiple factors (n), i.e., 4. Further, p iterations are performed to form each column. In this example, p=3 (as obtained from the INI table). In this context, 'p' is defined as a prime number of the second highest level from the first sample user input. As indicated by a reference numeral 402, the second highest level in FIG. 4A is 3. Since prime of number 3 is 3, the value of p is set to 3 in the example embodiment illustrated in FIG. 4A. As maximum number of levels is 4, each block includes 4 levels (arranged in an ascending order). Further, as shown in FIG. 4B, the OA which includes 12 runs (i.e., 3 iterations multiplied by 4 values in each iteration) gives an optimum number of test cases (indicated row-wise across all the four columns).

In the example embodiment illustrated in FIG. 4B, the OA includes 12 rows (i.e., 12 runs) and 4 columns (i.e., C1, C2, C3 and C4) as explained above. Further, the manner in which each column in the table 400B is formed is described as follows. In one exemplary implementation, a block 404 is created, which includes the levels 0 to k−1 of the system (in this example, k=4), i.e., the block 404 in the column CI of the OA includes the levels 0, 1, 2 and 3 in an ascending order (i.e., the block 404 in the column C1 of the OA includes the levels F1A, F1B, F1C and F1D as illustrated in FIG. 4B). In this embodiment, since, p=3, the above created block 404 is repeated vertically 2 more times in the column C1 of the OA as indicated by reference numerals 406 and 408 in FIG. 4B.

Further, the column C2 of the OA is formed by setting a value of block 410 to 0 in the column C2 of the OA, by setting a value of block 412 to 1 in the column C2 of the OA, by setting a value of block 414 to 2 in the column C2 of the OA, i.e., setting the level F2A against the block 410, setting the level F2B against the block 412 and setting the level F2C against the block 414 as illustrated in the table 400B. Normally, this process continues till $p^{th}$ block by putting 'p−1' against the $p^{th}$ block (i.e., $3^{rd}$ block) in the column C2 of the OA.

Subsequently, the columns C3 and C4 of the OA are formed using the levels in the columns C1 and C2 of the OA (as illustrated in FIG. 3B). The column C3 of the OA is formed by using the equation: C2+1*C1 (i.e., $C_x = C_g + i*C_j$, where, the parameters i=1, j=1, g=2 and x=3). From the above equation and as shown in FIG. 4B, the column C3 lists the levels 0, 1, 2, 0, 1, 2, 0, 1, 2, 0, 1 and 2. For example, the first level 0 is obtained by putting values of the elements in the columns C1 and C2 of the OA in the above equation. Similarly, remaining levels are obtained using the values of the elements in columns C1 and C2 of the OA in the same equation given above. As shown in FIG. 4B, the column C3 lists the levels F3A, F3B, F3C, F3A, F3B, F3C, F3A, F3B, F3C, F3A, F3B and F3C in the first format which correspond to the levels 0, 1, 2, 0, 1, 2, 0, 1, 2, 0, 1 and 2 in the second format.

Likewise, the column C4 of the OA is formed using the equation: C2+2*C1. Based on the values of the elements in the columns C1 and C2 of the OA, values of elements in the column C4 of the OA are calculated. According to the example embodiment illustrated in FIG. 4B, the column C4 of the OA lists the level F4A (which implies that an output of the equation is the level 0 in the second format, i.e., the level F4A in the first format). Further, it can be noted that the OA illustrated in the table 400B, displays the columns C1-C4 of the generated OA in the first format (i.e., the initial format obtained from the user). Also, it should be noted that FIGS. 4A and 4B merely illustrate an example of generating the OA. Alternatively, the OA can be generated for any number of multiple factors and levels in a system.

Figure 5A:
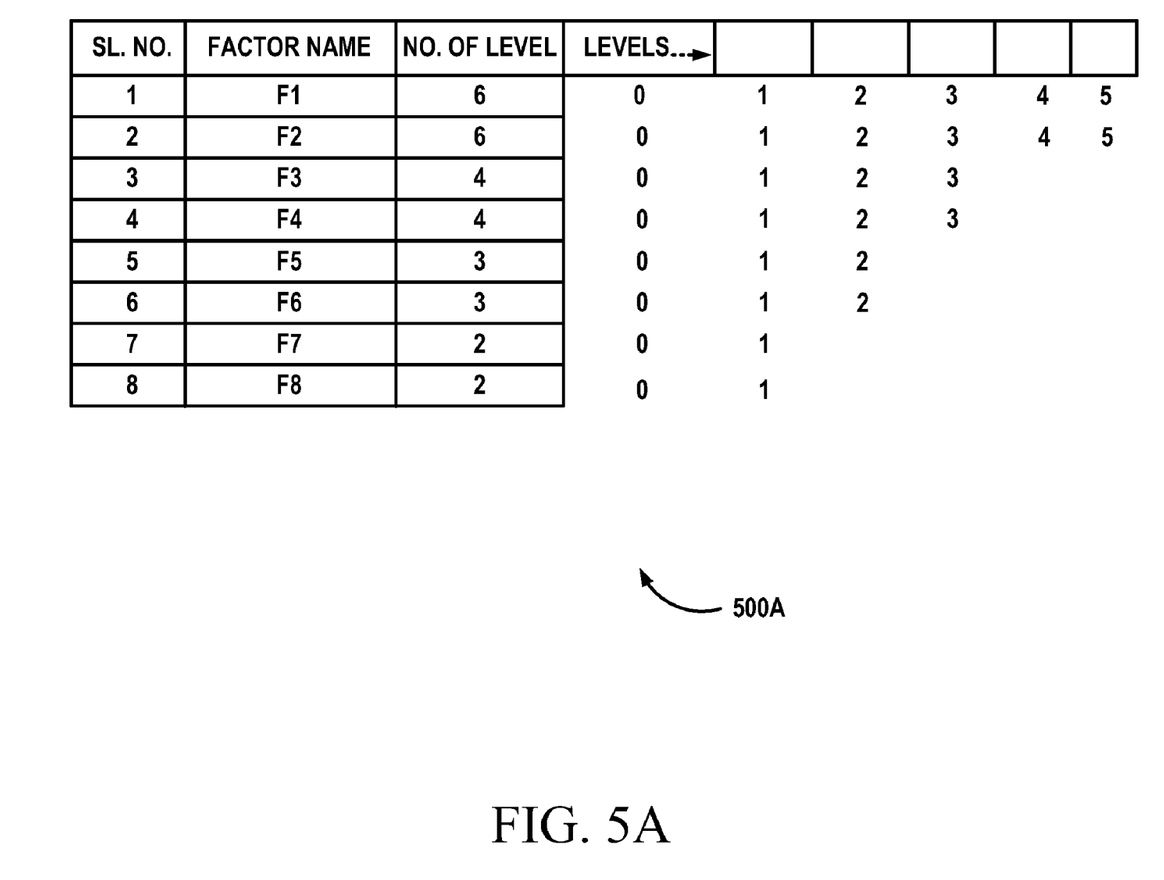
FIGS. 5A and 5B show example snapshots of a second sample user input in a first format and of an OA resulting from the second sample user input in the second format.
Figure 5B:
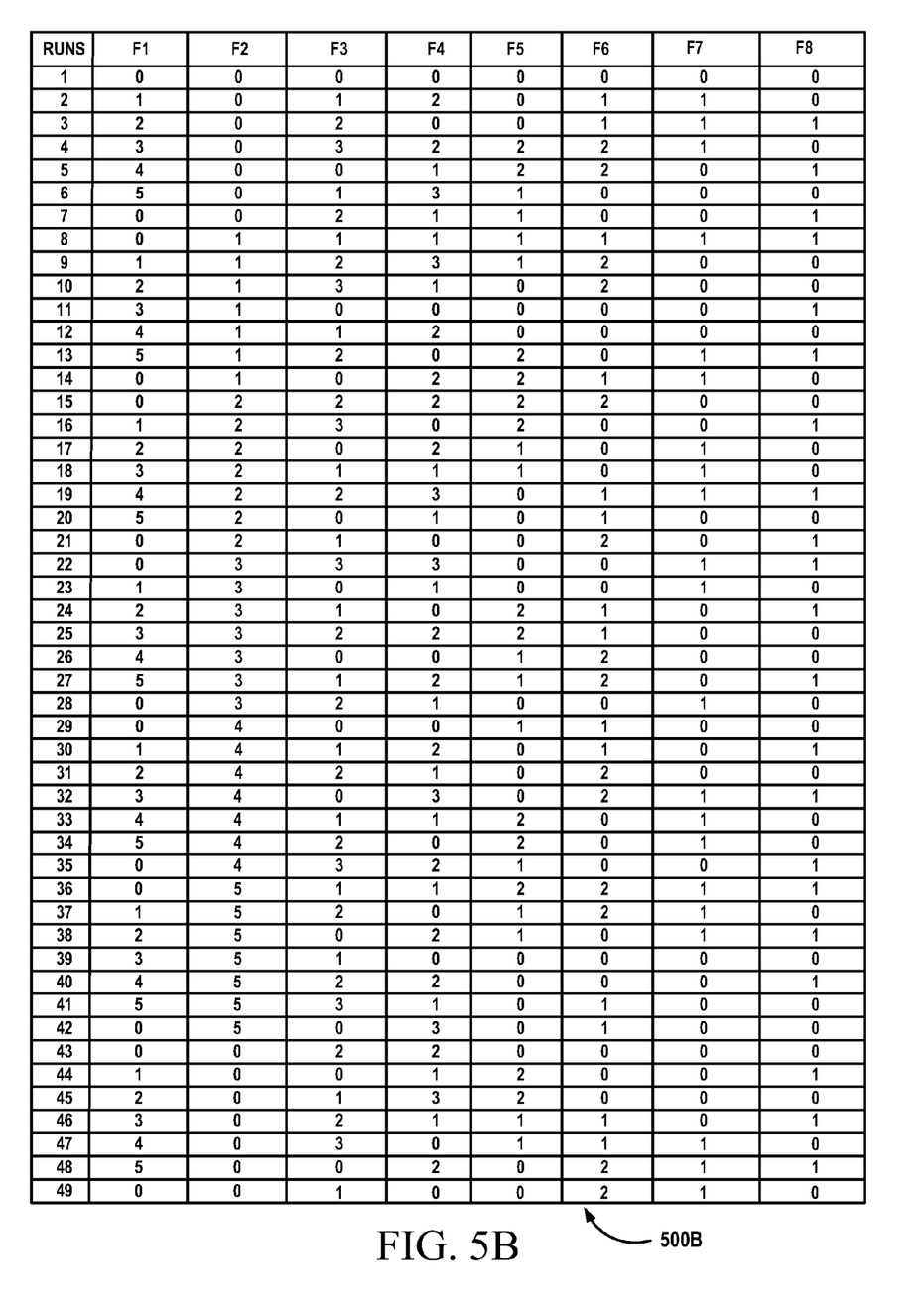

FIGS. 5A and 5B show example snapshots of a second sample user input in a first format and of an OA resulting from the second sample user input in the second format. Particularly, table 500A illustrates the second sample user input in the first format and table 500B illustrates the OA resulting from the second sample user input in the second format. One can envision that, a user input in a first format is received and transformed into a second format for processing and results can be outputted without transforming the user input back to the first format. The OA illustrated in the table 500B of FIG. 5B is generated in a similar fashion as described in FIG. 4B except that, the results of a predetermined number of iterations are outputted in the second format, i.e., the results are not transformed from the second format into the first format upon performing the predetermined number of iterations.

In the example embodiment illustrated in FIG. 5A, the second sample user input obtained from a user (e.g., practitioner) includes a number of multiple factors (n)=8, i.e., F1, F2, F3, F4, F5, F6, F7, and F8. Further, a number of levels associated with each factor F1, F2, F3, F4, F5, F6, F7 and F8 is 6, 6, 4, 4, 3, 3, 2 and 2, respectively. As illustrated in FIG. 5A, the levels associated with each factor are sorted in a descending order. Further, it can be seen from the table 500A that the levels corresponding to the factors are in the second format (i.e., numeric form). In some embodiment, the second sample user input is transformed from the first format to the second format for processing.

As the number of multiple factors (n) obtained from the user is 8, the OA includes 8 columns. Further, based on the number of multiple factors and levels, a set of parameters (pi's, qi's, gi's, etc.) are designated using the INI table. Also, in this example, the parameters q, g and h are initialized to 0, 2 and 1, respectively. In the example embodiment illustrated in FIG. 5B, the OA tool is generated as follows:

1) generate a column C1 by listing the levels 0, 1, . . . , k−1, where k=6 (a highest level as obtained from the INI table)
   a. generate a block including multiple levels in the system in an ascending order, the block includes the levels 0-5
   b. repeat the block (e.g., including the levels 0-5) vertically parameter p (p=7) times. It can be noted that while repeating the block created in step a, every $7^{th}$ level (e.g., level 7, 14, 21, 28, and 42) is indicated by 0 which is a valid level (even though the factor F1 in FIG. 5A includes only 6 levels).
2) generate a column C2 by iteratively assigning values for each block until a parameter (p−1) is assigned for a $p^{th}$ block, i.e., the level 0 against a first block in the column C2, the level 1 against a second block in the column C2, the level 2 against a third block in the column C2, the level 3 against a fourth block in the column C2, the level 4 against a fifth block in the column C2, the level 5 against a sixth block in the column C2
3) generate columns C3, C4, C5, C6, C7 and C8 by using the equation: Cx=Cg+i*Cj, where, parameter i=1 to p−1 (i.e., the parameter i=1 for C3, 2 for C4, 3 for C5, 4 for C6, 5 for C7 and 7 for C8), parameter j=1 to q (q=1, in this example). A parameter x is set by adding a value of the parameter i times the parameter j to the parameter g (i.e., x=g+i*j). The values for the elements in the columns C3, C4, C4, C5, C6, C7, and C8 are given in the second format according the example embodiment illustrated in FIG. 5B.

In this manner, the OA based on the second sample user input (i.e., 8 factors and associated levels) is generated using the OA algorithm 300A described in FIGS. 3A and 3B.

FIG. 6 shows an exemplary INI table 600, according to one embodiment. Particularly, FIG. 6 illustrates the INI table 600 including multiple pairs of a number 602 and an associated number 604 which is a prime of the number 602. In some embodiments, the number 602 indicates a level in a system. In these embodiments, the associated number 604 indicates a number of iterations required for generating combinations of multiple factors and multiple levels required for testing pair-wise interactions between the multiple factors and the multiple levels. In one embodiment, the INI table 600 is generated by the INI table generation module 104 of FIG. 1. In an alternate embodiment, the INI table generation module 104 can access the INI table 600 generated by a different source.

It can be noted that, the INI table 600 can also be used to determine a set of parameters based on a user input (e.g., factors and levels) for testing each level of the factor against all the levels of all other factors in the system. For example, the set of parameters that are determined using the INI table 600 which includes but not limited to a highest level (k), maximum factor numbers (q1, q2, q3, etc.), interaction columns (g1, g2, g3, etc.) and the like.

Figure 7:
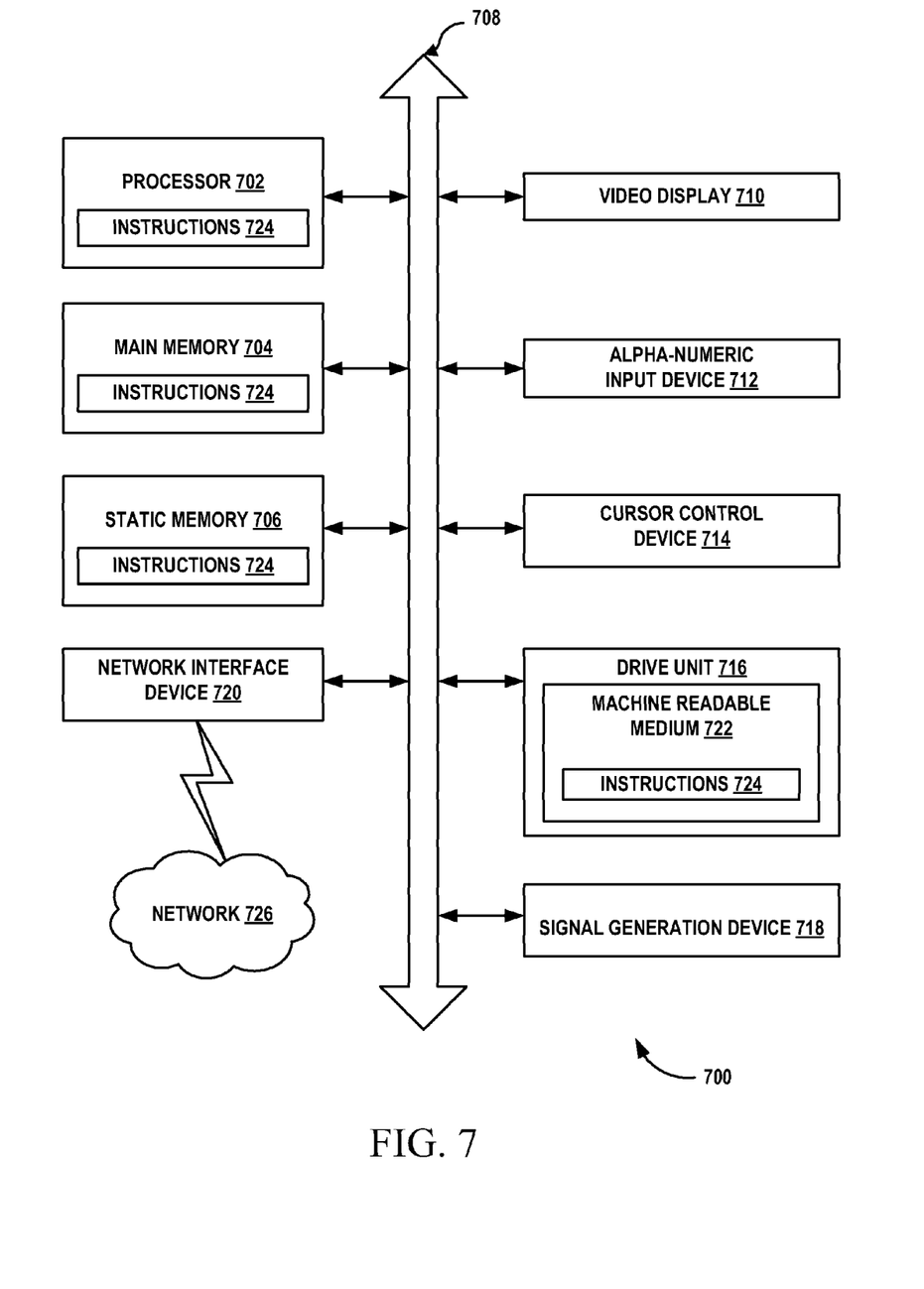
FIG. 7 shows a diagrammatic system view of a data processing system in which any of the embodiments disclosed herein may be performed, according to one embodiment.

FIG. 7 shows a diagrammatic system view 700 of a data processing system in which any of the embodiments disclosed herein may be performed, according to one embodiment. Particularly, the diagrammatic system view of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724 and a network 726.

The diagrammatic system view 700 may indicate a personal computer and/or a data processing system in which one or more operations disclosed herein are performed. The processor 702 may be a microprocessor, a state machine, an application specific integrated circuit, a field programmable gate array, etc. The main memory 704 may be a dynamic random access memory and/or a primary memory of a computer system. The static memory 706 may be a hard drive, a flash drive, and/or other memory information associated with the data processing system.

The bus 708 may be an inter-connection between various circuits and/or structures of the data processing system. The video display 710 may provide graphical representation of information on the data processing system. The alpha-numeric input device 712 may be a keypad, keyboard and/or any other input device of text (e.g., a special device to aid the physically handicapped). The cursor control device 714 may be a pointing device such as a mouse. The drive unit 716 may be a hard drive, a storage system, and/or other longer term storage subsystem.

The signal generation device 718 may be a bios and/or a functional operating system of the data processing system. The network interface device 720 may perform interface functions (e.g., code conversion, protocol conversion, and/or buffering) required for communications to and from the network 726 between a number of independent devices (e.g., of varying protocols). The machine readable medium 722 may provide instructions on which any of the methods disclosed herein may be performed. The instructions 724 may provide source code and/or data code to the processor 702 to enable any one or more operations disclosed herein.

For example, a storage medium having instructions, that when executed by a computing platform, result in execution of a method of generating an OA of test cases for testing a system, the method includes accepting a user input, the user input including multiple factors and multiple levels associated with the system, accessing a reference table (e.g., the INI table of FIG. 6) to determine a set of parameters based on the user input for testing each level of a factor against all levels of all other factors in the system, and performing a predetermined number of iterations based on the set of parameters to generate the OA of the test cases that includes combinations of the multiple factors and the multiple levels required for testing pair-wise interactions between the multiple factors and the multiple levels.

For example, the reference table is an INI table which includes multiple pairs of a number indicating a level in the system and an associated number indicating a prime of the number indicating the level in the system. The storage medium may have instructions to accept the user input in a first format and process the user input by transforming the user input from the first format into a second format, and by sorting the multiple levels from the transformed user input in a descending order. The storage medium may have instructions to perform the predetermined number of iterations on the processed user input, transform the results of the performed predetermined number of iterations from the second format to the first format, reorder the transformed results of the predetermined number of iterations according to a predetermined criteria, and output the reordered results of the predetermined number of iterations in the first format.

The storage medium may also have instructions to generate a first column of the OA by listing 0, 1, . . . , k−1, where k is the highest level as obtained from the INI table, set parameters $q_0$ to 1 and $g_0$ to 2, initialize a parameter h to 0, and determine if a parameter x is less than the parameter n, if so, perform a set of operations and increment the parameter h by 1, if not, output a result of each iteration in the first format.

The performing the set of operations includes designating the parameters e to h−1, p to $p_h$, g to $g_e$, and q to $q_e$, generating a block including the multiple levels in the system in an ascending order, repeating the block vertically parameter p times, generating a $Cg^{th}$ column of the OA by iteratively assigning values for each block until a parameter (p−1) is assigned for a $p^{th}$ block, and iteratively generating a $Cx^{th}$ column of the OA until the parameter x is equal to the parameter n (i.e., a number of factors).

The iteratively generating the $Cx^{th}$ column of the OA includes setting parameters i and j to 1, and determining a value of an element in the $Cx^{th}$ column of the OA while the parameter i is less than the parameter p, where the determining includes if the parameter j is less than or equal to the parameter q, then setting a value of the parameter x by adding a value of the parameter i times the parameter j to the parameter g, calculating a parameter result 1 by adding a value of the parameter i times a parameter Cj to a parameter Cg, setting a value of all the elements in the $Cx^{th}$ column of the OA to the parameter result 1 mod parameter p, and incrementing the parameter j by 1, and if not, incrementing the parameter i by 1 if the parameter i is less than the parameter p. The OA tool described above ensures a coverage for testing a software application such that all possible scenarios and interactions between different modules (or components) in the software application is taken care of. Further, the above-described technique facilitates to analyze the software application in terms of factors and levels (which form an input for the OA tool) and to generate all possible combinations of the multiple factors and the multiple levels required for testing pair-wise interactions between the multiple factors and the multiple levels, thereby, eliminating all single and double mode defects which are considered as a common source of errors. Upon generation of these combinations, test cases are written accordingly.

In addition, the above-described method ensures that redundant test cases (or scenarios) are not generated and at the same time makes sure that, all possible interactions between modules or parameters are considered. In one embodiment, the above-described OA system enables a user to add additional test cases, which are not present in the system, thereby creating an efficient test suite. For example, the additional test cases could be based on criticality of the software application or from past experience on a similar software application. It can be noted that the OA algorithm (e.g., the combinatorics algorithm) in the present invention uses a stable and structured iterative procedure (instead of heuristic techniques) to generate combination of the factors and the levels.

The above-described method also ensures that all the factors and the levels are touched upon at least once, thereby, ensuring quality of the software application being delivered. Further, the above-described technique gives an optimized number of test cases that ensures savings in terms of time taken for generation of test case(s) and execution of test case(s).

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of generating an orthogonal array (OA) of test cases for testing a system comprising:
    accepting a user input in a first format, the user input including multiple factors and multiple levels associated with the system;
    processing the user input by transforming the user input from the first format into a second format, and by sorting the multiple levels from the transformed user input in a descending order;
    accessing a reference table to determine a set of parameters based on the user input for testing each level of a factor against all levels of all other factors in the system; and
    performing a predetermined number of iterations on the processed user input based on the set of parameters to generate the OA of the test cases, wherein the OA includes combinations of the multiple factors and the multiple levels required for testing pair-wise interactions between the multiple levels and the multiple factors, wherein generating the OA of the test cases includes:
        transforming results of the predetermined number of iterations from the second format to the first format;
        reordering the transformed results of the predetermined number of iterations according to predetermined criteria; and
        outputting the reordered results of the predetermined number of iterations in the first format.

2. The method of claim 1, wherein the reference table is an iteration and interaction table (INI table) including multiple pairs of a number indicating a level in the system and an associated number indicating a prime of the number indicating the level in the system.

3. A method of generating an orthogonal array (OA) of test cases for testing a system comprising:
    accepting a user input, the user input including multiple factors and multiple levels associated with the system;
    accessing a reference table to determine a set of parameters based on the user input for testing each level of a factor against all levels of all other factors in the system, wherein the reference table is an iteration and interaction table (INI table) including multiple pairs of a number indicating a level in the system and an associated number indicating a prime of the number indicating the level in the system; and
    performing a predetermined number of iterations based on the set of parameters to generate the OA of the test cases, wherein the OA includes combinations of the multiple factors and the multiple levels required for testing pair-wise interactions between the multiple levels and the multiple factors, wherein generating the OA of the test cases comprises:
        accepting the user input in a first format;
        processing the user input by transforming the user input from the first format into a second format, and by sorting the multiple levels from the transformed user input in a descending order;
        performing the predetermined number of iterations on the processed user input;

transforming results of the predetermined number of iterations from the second format to the first format;

reordering the transformed results of the predetermined number of iterations according to predetermined criteria; and outputting the reordered results of the predetermined number of iterations in the first format.

4. The method of claim 3, further comprising:

generating a first column of the OA by listing 0, 1, ..., k−1, where k is the highest level as obtained from the INI table;

setting parameters $q_0$ to 1 and $g_0$ to 2;

initializing a parameter h to 0;

determining if a parameter x is less than a parameter n;

if so, performing a set of operations and incrementing the parameter h by 1; and if not, outputting a result of each iteration in the first format.

5. The method of claim 4, wherein performing the set of operations comprises:

designating parameters e to h−1, p to $p_h$, g to $g_e$, and q to $q_e$;

generating a block including the multiple levels in the system in an ascending order;

repeating the block vertically parameter p times;

generating a $Cg^{th}$ column of the OA by iteratively assigning values for each block until a parameter (p−1) is assigned for a $p^{th}$ block; and iteratively generating the $Cx^{th}$ column of the OA until the parameter x is equal to the parameter n.

6. The method of claim 5, wherein iteratively generating the $Cx^{th}$ column of the OA until the parameter x is equal to the parameter n comprises:

setting parameters i and j to 1; and determining a value of an element in the $Cx^{th}$ column of the OA while the parameter i is less than the parameter p, wherein the determining comprises:

if the parameter j is less than or equal to the parameter q, then setting a value of the parameter x by adding a value of the parameter i times the parameter j to the parameter g, calculating a parameter result 1 by adding a value of the parameter i times a parameter Cj to a parameter Cg, setting a value of all the elements in the $Cx^{th}$ column of the OA to a parameter result 1 mod parameter p, and incrementing the parameter j by 1; and if not, incrementing the parameter i by 1 if the parameter i is less than the parameter p.

7. An article, comprising:

a storage medium having instructions, that when executed by a computing platform, result in execution of a method of generating an orthogonal array (OA) of test cases for testing a system, comprising:

accepting a user input in a first format, the user input including multiple factors and multiple levels associated with the system;

processing the user input by transforming the user input from the first format into a second format, and by sorting the multiple levels from the transformed user input in a descending order;

accessing a reference table to determine a set of parameters based on the user input for testing each level of a factor against all levels of all other factors in the system; and performing a predetermined number of iterations on the processed user input based on the set of parameters to generate the OA of the test cases, wherein the OA includes combinations of the multiple factors and the multiple levels required for testing pair-wise interactions between the multiple factors and the multiple levels, wherein generating the OA of the test cases includes:

transforming results of the predetermined number of iterations from the second format to the first format;

reordering the transformed results of the predetermined number of iterations according to predetermined criteria; and outputting the reordered results of the predetermined number of iterations in the first format.

8. The article of claim 7, wherein the reference table is an iteration and interaction table (INI table) including multiple pairs of a number indicating a level in the system and an associated number indicating a prime of the number indicating the level in the system.

9. An article, comprising:

a storage medium having instructions, that when executed by a computing platform, result in execution of a method of generating an orthogonal array (OA) of test cases for testing a system, comprising:

accepting a user input, the user input including multiple factors and multiple levels associated with the system;

accessing a reference table to determine a set of parameters based on the user input for testing each level of a factor against all levels of all other factors in the system, wherein the reference table is an iteration and interaction table (INI table) including multiple pairs of a number indicating a level in the system and an associated number indicating a prime of the number indicating the level in the system; and performing a predetermined number of iterations based on the set of parameters to generate the OA of the test cases, wherein the OA includes combinations of the multiple factors and the multiple levels required for testing pair-wise interactions between the multiple levels and the multiple factors, wherein generating the OA of the test cases comprises:

accepting the user input in a first format;

processing the user input by transforming the user input from the first format into a second format, and by sorting the multiple levels from the transformed user input in a descending order;

performing the predetermined number of iterations on the processed user input;

transforming results of the predetermined number of iterations from the second format to the first format;

reordering the transformed results of the predetermined number of iterations according to predetermined criteria; and outputting the reordered results of the predetermined number of iterations in the first format.

10. The article of claim 9, further comprising:

generating a first column of the OA by listing 0, 1, ..., k−1, where k is the highest level as obtained from the INI table;

setting parameters $q_0$ to 1 and $g_0$ to 2;

initializing a parameter h to 0;

determining if a parameter x is less than a parameter n;

if so, performing a set of operations and incrementing the parameter h by 1; and if not, outputting a result of each iteration in the first format.

11. The article of claim 10, wherein performing the set of operations comprises:

designating parameters e to h−1, p to $p_h$, g to $g_e$, and q to $q_e$;
generating a block including the multiple levels in the system in an ascending order;
repeating the block vertically parameter p times;
generating a $Cg^{th}$ column of the OA by iteratively assigning values for each block until a parameter (p−1) is assigned for a $p^{th}$ block; and
iteratively generating the $Cx^{th}$ column of the OA until the parameter x is equal to the parameter n.

12. The article of claim 10, wherein iteratively generating the $Cx^{th}$ column of the OA until the parameter x is equal to the parameter n comprises:
setting parameters i and j to 1; and
determining a value of an element in the $Cx^{th}$ column of the OA while the parameter i is less than the parameter p, wherein the determining comprises:
if the parameter j is less than or equal to the parameter q, then setting a value of the parameter x by adding a value of the parameter i times the parameter j to the parameter g, calculating a parameter result 1 by adding a value of the parameter i times a parameter Cj to a parameter Cg, setting a value of all the elements in the $Cx^{th}$ column of the OA to a parameter result 1 mod parameter p, and incrementing the parameter j by 1; and
if not, incrementing the parameter i by 1 if the parameter i is less than the parameter p.

13. A system for generating an orthogonal array (OA) of test cases for testing a first system comprising:
a processor;
memory coupled to the processor, wherein the memory includes:
an input accepting module to accept a user input in a first format, the user input including multiple factors and multiple levels associated with the first system in a first format;
a transformation module configured to transform the user input from the first format into a second format to process the user input, and to sort the multiple levels from the transformed user input in a descending order;
an iteration and interaction (INI) table generation module to generate an INI table;
an iteration determination module to access the INI table to determine a number of iterations required based on a set of parameters based on the user input for testing each level of a factor against all levels of all other factors in the first system; and
an iteration performance module to perform a predetermined number of iterations on the processed user input based on the set of parameters to generate the OA of the test cases, wherein the OA includes combinations of the multiple factors and the multiple levels required for testing pair-wise interactions between the multiple levels and the multiple factors, wherein the transformation module further adapted to transform results of the predetermined number of iterations from the second format to the first format and to re-order the transformed results of the predetermined number of iterations according to predetermined criteria.

14. The system of claim 13, wherein the INI table generation module is configured to generate the INI table including multiple pairs of a number indicating a level in the first system and an associated number indicating a prime of the number indicating the level in the first system.

15. A system for generating an orthogonal array (OA) of test cases for testing a first system comprising:
a processor;
memory coupled to the processor, wherein the memory includes:
an input accepting module to accept a user input, the user input including multiple factors and multiple levels associated with the first system in a first format;
an iteration and interaction (INI) table generation module to generate an INI table, wherein the INI table generation module is configured to generate the INI table including multiple pairs of a number indicating a level in the first system and an associated number indicating a prime of the number indicating the level in the first system;
an iteration determination module to access the INI table to determine a number of iterations required based on a set of parameters based on the user input for testing each level of a factor against all levels of all other factors in the first system;
an iteration performance module to perform a predetermined number of iterations based on the set of parameters to generate the OA of the test cases, wherein the OA includes combinations of the multiple factors and the multiple levels required for testing pair-wise interactions between the multiple levels and the multiple factors; and
a transformation module configured to transform the user input from the first format into a second format to process the user input, and to sort the multiple levels from the transformed user input in a descending order and further adapted to transform results of the predetermined number of iterations from the second format to the first format and to re-order the transformed results of the predetermined number of iterations according to predetermined criteria.

16. The system of claim 15, further comprising:
a level validation module configured to replace additional levels by valid levels when a number of the levels is greater than a number of actual levels; and
an output module to output the reordered results of the predetermined number of iterations in the first format.

17. The system of claim 16, further comprising:
an OA column generation module to generate a first column of the OA by listing 0, 1, . . . , k−1, where k is the highest level as obtained from the INI table; and
a numeric operation module to set parameters $q_0$ to 1 and $g_0$ to 2, to initialize a parameter h to 0, and to determine if a parameter x is less than a parameter n.

18. The system of claim 17, wherein the numeric operation module is configured to perform a set of operations if the parameter x is less than the parameter n and to increment the parameter h by 1 while the parameter x is less than the parameter n.

19. The system of claim 17, wherein the numeric operation module, configured to perform the set of operations, comprises:
a designate module to designate parameters e to h−1, p to $p_h$, g to $g_e$, and q to $q_e$; and
a block generation module configured to generate a block including the multiple levels in the first system in an ascending order, and wherein the OA column generation module is configured to generate a $Cg^{th}$ column of the OA by iteratively assigning values for each block until a parameter (p−1) is assigned for a $p^{th}$ block, and to iteratively generate the $Cx^{th}$ column of the OA until the parameter x is equal to the parameter n.

20. The system of claim 19, wherein the OA column generation module, configured to iteratively generate the $Cx^{th}$ column of the OA comprises:

an initialize module to set values of parameters i and j to 1; and a value determination module configured to determine a value of an element in the $Cx^{th}$ column of the OA while the parameter i is less than the parameter p, the value determination module comprises:

a first module configured to set a value of the parameter x by adding a value of the parameter i times the parameter j to the parameter g if the parameter j is less than or equal to the parameter q;

a second module configured to calculate a parameter result 1 by adding a value of the parameter i times a parameter Cj to a parameter Cg;

a third module configured to set a value of all the elements in the $Cx^{th}$ column of the OA to a parameter result 1 mod parameter p, and to increment the parameter j by 1; and a fourth module configured to increment the parameter i by 1 if the parameter i is less than the parameter p.

21. The system of claim 17, wherein the numeric operation module is coupled with the output module to output a result of each iteration in the first format if the parameter x is not less than the parameter n.

* * * * *